Aug. 5, 1969

W. P. RUSSON 3,459,035

FLUIDIC LOOSE SOLIDS AND GRANULAR MATERIAL
LEVEL SENSING APPARATUS

Filed Dec. 27, 1967

INVENTOR.
WAYNE P. RUSSON
BY
H P Ferry
ATTORNEY

United States Patent Office 3,459,035
Patented Aug. 5, 1969

3,459,035
FLUIDIC LOOSE SOLIDS AND GRANULAR MATERIAL LEVEL SENSING APPARATUS
Wayne P. Russon, American Fork, Utah, assignor to Sperry Rand Corporation, a corporation of Delaware
Filed Dec. 27, 1967, Ser. No. 693,946
Int. Cl. G01b *13/08*
U.S. Cl. 73—37.5                              6 Claims

ABSTRACT OF THE DISCLOSURE

Fluidic apparatus for detecting the level of a material stored in a container that is particularly suitable for use with loose solids and granular material.

BACKGROUND OF THE INVENTION

Field of the invention

The present invention pertains to fluidic sensing apparatus for measuring and/or controlling the level of a material in a container.

Description of the prior art

The prior art devices for sensing the level of a material such as wheat in a grain elevator are generally electrical, have moving parts and are relatively complex. Prior art electrical devices of this type are inherently dangerous since a spark caused by a relay opening, for example, may cause an explosion within the storage container. Further, the moving parts of the prior art devices tend to wear out, break down or change their characteristics to the detriment of the operation of the system. Further, the prior art devices are generally complex and expensive to install and maintain.

SUMMARY OF THE INVENTION

The present invention utilizes a fluidic probe having cooperative tubes which produce a Bernoulli effect that is combined with fluidic components to detect material levels safely and economically in a storage container. The present invention operates on the basis of fluidics, thereby eliminating the danger of dust explosion. Further, since there are no moving parts to wear out, break or change their characteristics; the system continues to maintain accuracy during its operation. The fluidic system of the present invention is relatively simple and inexpensive to install and maintain.

DESCRIPTION OF THE PREFERRED EMBODIMENT

Figure 1:
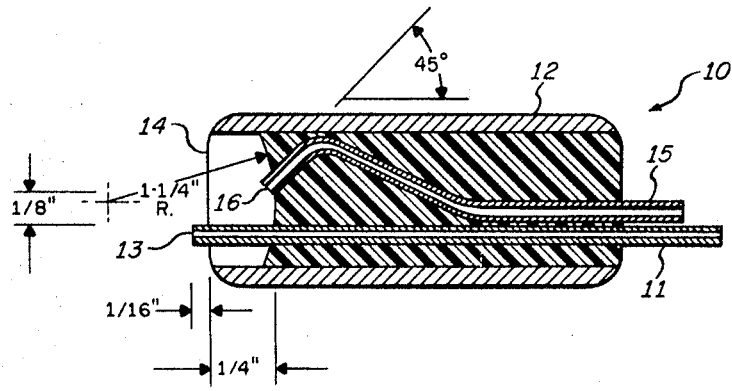
FIG. 1 is an enlarged cross-sectional side view of a fluidic probe for sensing loose solids and granular material.

Referring now to FIG. 1, a fluidic probe 10 is disclosed having a tube 11 which is straight and extends through a hollow cylindrical housing 12 and has an extremity 13 which projects approximately 1/16", for example, beyond an extremity 14 of the housing 12. Another tube 15 also projects within the housing 12 and has its extremity 16 bent at approximately a 45° angle with respect to the tube 11. The extremity 16 of the tube 15 is disposed within the hollow housing 12 approximately 5/16" away from the extremity 13 of the tube 11 and it is elevated approximately 1/8" above the tube 11 to provide a venturi effect in the tube 11, in a manner to be explained. The tubes 11 and 15 may be any suitable material, for example, brass having a 1/32" I.D. and a 1/16'" O.D. The housing 12 may be of a suitable material such as aluminum having a 9/16" O.D. with a 1/8" wall thickness. The tubes 11 and 15 are secured within the housing 12 by means of an epoxy resin and relatively arranged to direct the air flow from the extremity 16 of the tube 15 to impinge upon the extremity 13 of the tube 11. To permit this free air flow, the epoxy fill may be recessed to have a 1¼" radius extending through the extremity 16 in order to obtain a venturi effect within the tube 11.

Figure 2:
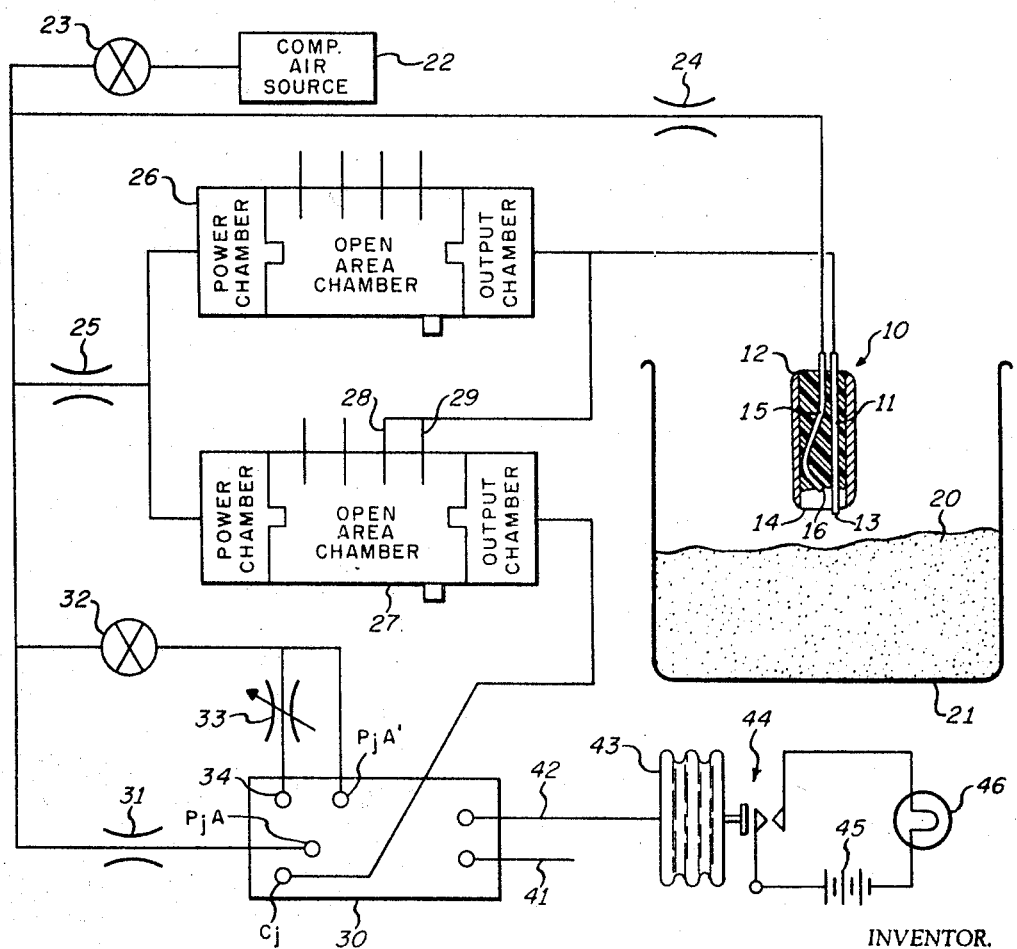
FIG. 2 is a schematic diagram of a fluidic system for sensing the level of loose solids or granular material in a storage container utilizing the probe of FIG. 1.

Referring now to FIG. 2, in order to detect the level of a material 20 within a container 21, the extremity 13 of the probe 10 is disposed at the desired height within the container 21. A compressed air source 22 provides air under pressure through an air pressure regulator 23 and an air restrictor 24 to the input of the tube 15. The air restrictor 24 provides air at a pressure of approximately 6 pounds per square inch to the tube 15.

Air is also provided from the source 22 through the regulator 23 and an air restrictor 25 to the inputs of turbulence amplifiers 26 and 27. The turbulence amplifiers 26 and 27 may be of the type manufactured by the Fluidic Division of the Howie Corporation. The output of the turbulence amplifier 26 is connected to the input of the tube 11 and also to control ports 28 and 29 of the turbulence amplifier 27. The output of the turbulence amplifier 27 is connected to the control jet input $C_j$ of a Schmitt trigger amplifier 30. The Schmitt trigger amplifier 30 may be of the type manufactured by the Fluidic Division of the Corning Glass Corporation. Air pressure at 6 pounds per square inch is applied to one power jet $P_jA$ of the Schmitt trigger 30 via the regulator 23 and an air restrictor 31. At the bias section of the Schmitt trigger amplifier 30, air pressure at 2 pounds per square inch is supplied from the regulator 23 via another regulator 32 and a variable air restrictor 33 to a bias control jet 34 which normally balances the signal from the control jet $C_j$. The 2 pounds per square inch air pressure from the regulator 32 is also provided to another power jet $P_jA'$. There are two outputs from the divider section of the Schmitt trigger amplifier 30 represented by output conduits 41 and 42. The output conduit 41 is vented to atmosphere while the output conduit 42 is connected to an air bellows 43 which is cooperative with a microswitch 44. Wired in series with the switch 44 is a 6 volt battery 45 and a 6 volt indicator lamp 46.

In operation, when the level of the material 20 in the container 21 is substantially below the extremity 13 of the probe 10, the 6 pounds per square inch air pressure will exit from the extremity 16 of the probe 10 at a critical speed and correct angle over the extremity 13 to create a Bernoulli effect which results in a negative pressure within the tube 11. This negative pressure draws air from within the tube 11 and also pulls air from the output of the turbulence amplifier 26 as well as from the control ports 28 and 29 of the turbulence amplifier 27.

During this time, the air supplied at the inputs of the turbulence amplifiers 26 and 27 travels into their respective power chambers and then travels from the power chamber port through an open area chamber forming a free flow pattern with laminar flow in each of the amplifiers 26 and 27. The laminar air flow travels toward and into the respective output chambers to exit at the respective outputs. The air pressures at the outputs of the respective turbulence amplifiers 26 and 27 measures, for example, 3 inches of water. The output pressure of the turbulence amplifiers 26 and 27 may be controlled, i.e., turned off, by a very small signal of air pressure measuring, for example, 3 mm. of water, applied at any of the four control ports. This small control signal destroys the laminar air flow, causing it to disperse in the open area chamber and exhaust out of this chamber through exhaust ports rather than out the output conduits. Thus, when a sufficient control signal is present, there is no output pressure from the turbulence amplifiers 26 and 27.

The output of the amplifier 27 is controlled by combining the output of the amplifier 26 and that from the tube 11 and transmitting the two signals into the amplifier 27 via the control ports 28 and 29. It will be recalled that the probe 10 has been calibrated to draw the correct amount of air out of the tube 11. Thus, during the time when there is no material adjacent the extremity 13 there is no signal into the control ports 28 and 29 and therefore the turbulence amplifier 27 is on, i.e., there is pressure at the output of the amplifier 27, which is applied as a control jet in the Schmitt trigger 30 to balance the bias control jet 34 thereby causing the output to emanate from the output conduit 41 and be venter to atmosphere.

When the material 20 in the container 21 reaches the desired level adjacent the extremity 13, the flow from the extremity 16 is prevented from flowing over the extremity 13 in the proper manner and reduces or eliminates the Bernoulli effect thereby reducing or eliminating the negative pressure in the tube 11. This produces a signal at the input of the control ports 28 and 29 of the amplifier 27 which disrupts the laminar flow in the open area chamber which results in no output from the amplifier 27, i.e., turning it off. The absence of a control jet to balance the bias jet in the Schmitt trigger amplifier 30 causes the main air stream to release the attachment it hand and it now switches across the divider section and securely attaches itself to exit from the output conduit 42. The increase in air pressure within the bellows 43 causes the bellows 43 to expand thereby closing the microswitch 44 which turns on the lamp 46. This output signal could also be used to control a valve, pump or other fluid or electrically operated device.

When the level of the material 20 in the container 21 again falls below the desired level adjacent the extremity 13, the Bernoulli effect will again predominate causing a negative pressure in the tube 11 and by means of the steps indicated above will cause the bellows 43 to contract thereby opening the microswitch 44 and turning the lamp 46 off.

In practice it has been found that the position of the extremity 13 of the probe 10 to maintain a desired level of the material in a container 21 depends upon the type of material 20. For example, when sensing a solid material such as a table top or a molten metal, the extremity 13 will sense the presence of the material when it comes within ¼" of the surface while when sensing the level of grain, such as wheat, it may have to be inserted about ½" into the wheat. In light materials, such as soap powder or sugar, the probe 10 may be inserted about 2" into the material. This is caused by the fact that in lighter materials, the air from the probe 10 tends to create a small pocket around the end of the extremity 13 which prevents it from sensing the material. This is overcome by compensating accordingly as explained above with respect to the specific material being measured.

It will be appreciated that certain components may be substituted for other equivalent components in the above disclosure. For example, the turbulence amplifier 26 functions as a resistor and in certain applications could be replaced by a fixed resistor.

While the invention has been described in its preferred embodiment, it is to be understood that the words which have been used are words of description rather than limitation and that changes within the purview of the appended claims may be made without departing from the true scope and spirit of the invention in its broader aspects.

I claim:
1. Fluidic apparatus for sensing the level of a material comprising fluidic probe means having a straight tube member responsive to said material when it reaches a predetermined level and having a second tube offset from straight tube with its extremity aimed at the extremity of the said first tube for providing a Bernoulli effect signal when said material is below said predetermined level,
   fluidic amplifying means responsive to said Bernoulli effect signal for providing a control signal in the absence of said Bernoulli effect signal,
   fluidic threshold defining means responsive to said control signal for providing a level signal when a threshold is exceeded, and
   utilization means responsive to said level signal for providing an indication when said predetermined level has been reached.
2. Apparatus of the character recited in claim 1 in which said fluidic amplifying means includes turbulence amplifier means having control port means connected to said first portion of said fluidic probe means.
3. Apparatus of the character recited in claim 1 in which said fluidic threshold defining means includes Schmitt trigger amplifying means having a control port connected to said fluidic amplifying means and an output conduit connected to said utilization means.
4. Apparatus of the character recited in claim 1 in which said utilization means includes bellows means responsive to said level signal and signal indicating means responsive to said bellows for providing a visual signal when said predetermined level is reached.
5. Fluidic probe means comprising:
   a first straight tube adapted to be connected to a first source of pressure fluid,
   a second tube adapted to be connected to a second source of pressure fluid,
   said second tube being off-set from said first tube and having an extremity disposed at an angle and in spaced cooperative relation with respect to an extremity of said first tube for providing a venturi effect in said first tube.
6. Fluidic probe means of the character recited in claim 5 in which said second tube extremity is disposed at an angle of approximately 45° and is spaced approximately ¼" away and is elevated approximately ⅛" above said first tube extremity.

References Cited

UNITED STATES PATENTS

| 1,977,969 | 11/1934 | McIntosh. | |
| 3,285,608 | 11/1966 | Lyman | 73—37.7 |

FOREIGN PATENTS

| 879,466 | 6/1953 | Germany. |
| 1,362,970 | 4/1964 | France. |

S. CLEMENT SWISHER, Primary Examiner

U.S. Cl. X.R.

73—290